5 Sheets—Sheet 1.

T. S. HALL & G. H. SNOW.
ELECTRO-MAGNETIC RAILROAD-SWITCH SIGNAL.

No. 191,958. Patented June 12, 1877.

Witnesses.
Otto Hufland
Robt. E. Miller

Inventors:
Thomas S. Hall
George H. Snow
By Van Santvoord & Stauff
their attorneys.

5 Sheets—Sheet 2.

T. S. HALL & G. H. SNOW.
ELECTRO-MAGNETIC RAILROAD-SWITCH SIGNAL.

No. 191,958. Patented June 12, 1877.

Witnesses.
Otto Hufeland
Robt. E. Miller

Inventors:
Thomas S. Hall
George H. Snow
by
Van Santvoord & Hauff
their attorney 5 Sheets—Sheet 3.
T. S. HALL & G. H. SNOW.
ELECTRO-MAGNETIC RAILROAD-SWITCH SIGNAL.
No. 191,958. Patented June 12, 1877.
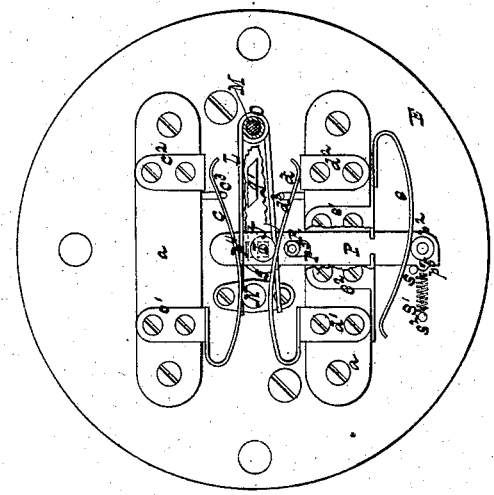
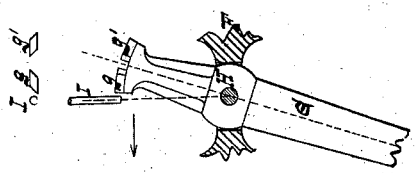
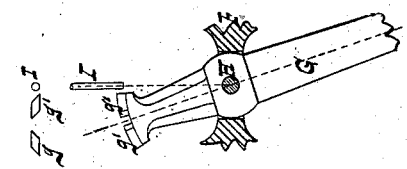
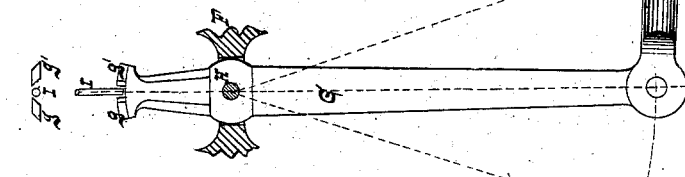
Witnesses.
Otto Hupland
Robt. E. Miller.
Inventors:
Thomas S. Hall
George H. Snow by
Van Santvoord & Hauff
their attys 5 Sheets—Sheet 4.
T. S. HALL & G. H. SNOW.
ELECTRO-MAGNETIC RAILROAD-SWITCH SIGNAL.
No. 191,958. Patented June 12, 1877.
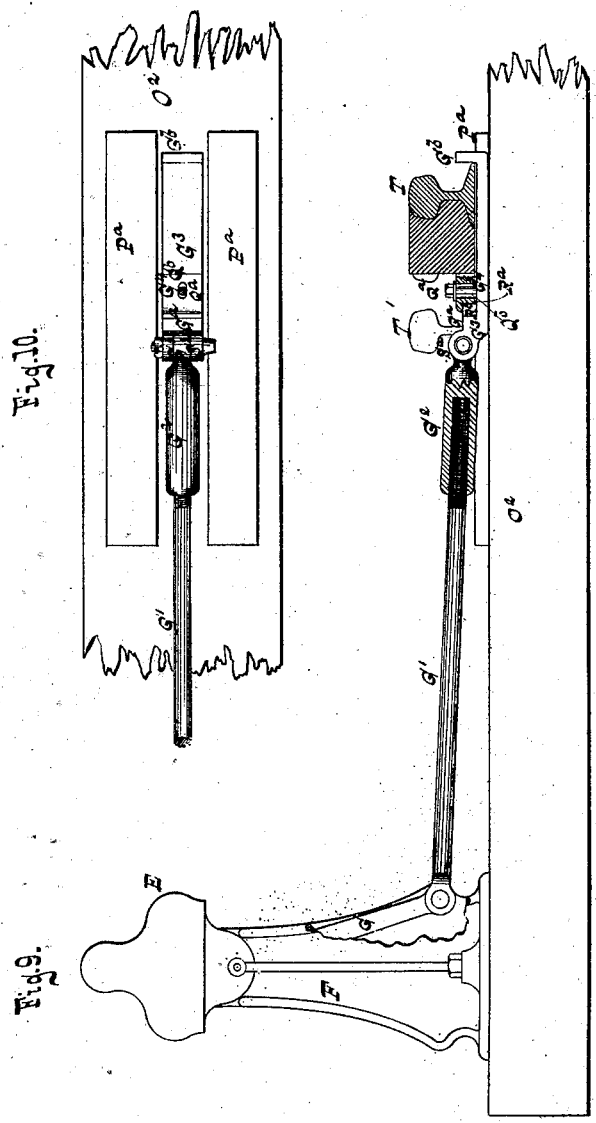

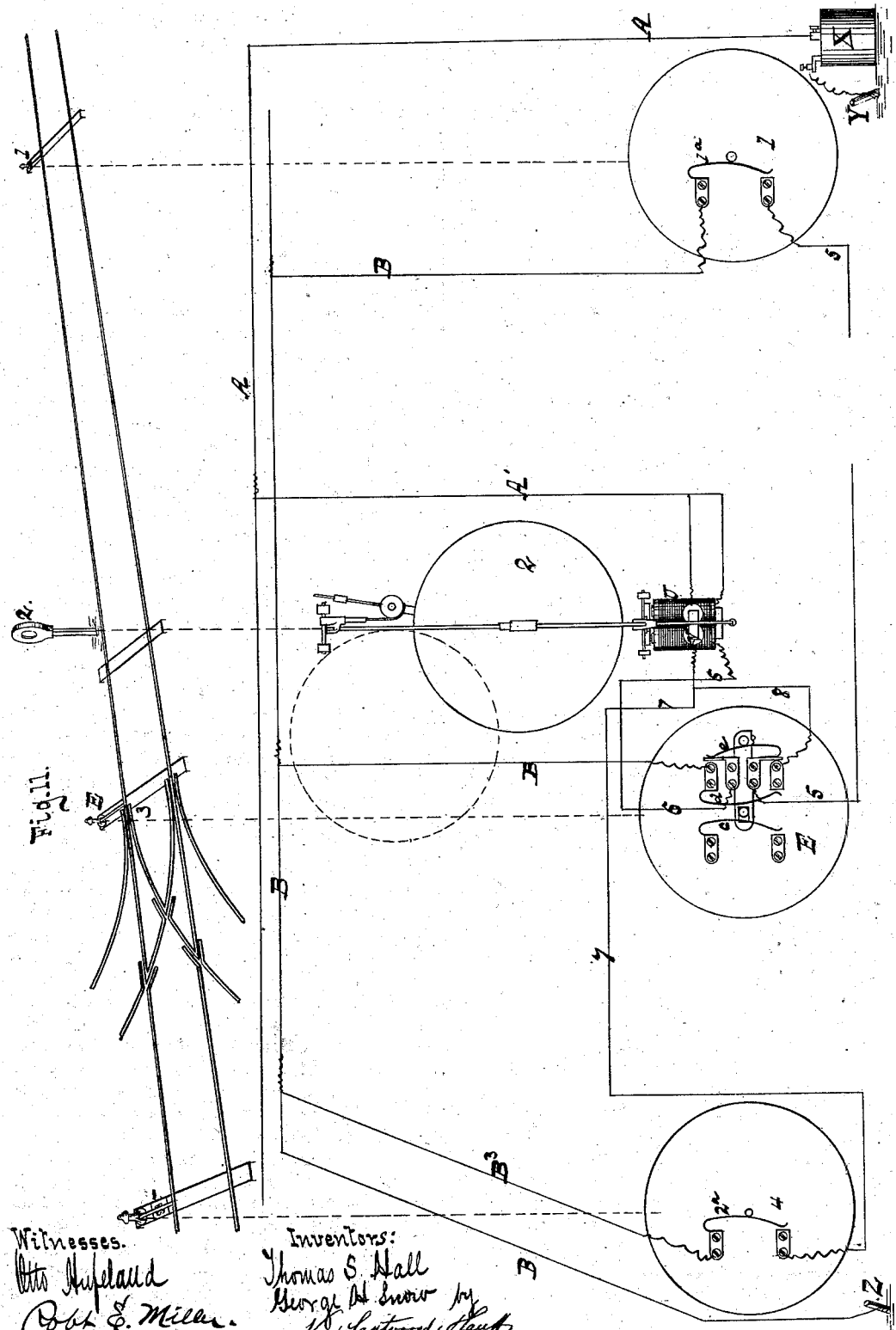

UNITED STATES PATENT OFFICE.

THOMAS S. HALL AND GEORGE H. SNOW, OF WEST MERIDEN, CONNECTICUT, ASSIGNORS TO THE HALL RAILWAY-SIGNAL COMPANY.

IMPROVEMENT IN ELECTRO-MAGNETIC RAILROAD-SWITCH SIGNALS.

Specification forming part of Letters Patent No. 191,958, dated June 12, 1877; application filed October 11, 1876.

*To all whom it may concern:*

Be it known that we, THOMAS S. HALL and GEORGE H. SNOW, of West Meriden, in the county of New Haven and State of Connecticut, have invented a new and Improved Electro-Magnetic Signal Apparatus for Railroad-Switches, which improvement is fully set forth in the following specification, reference being had to the accompanying drawings, in which—

Figure 1:
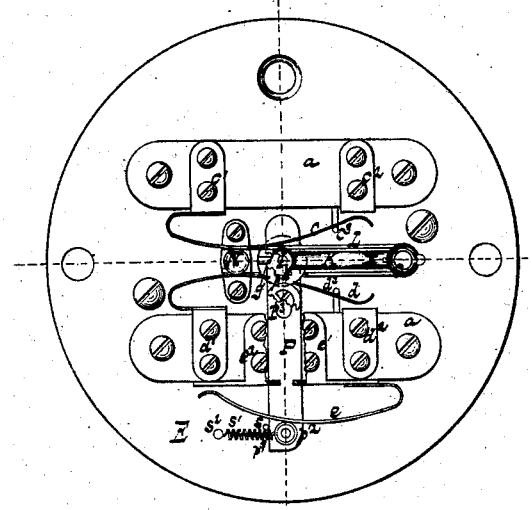
Figure 2:
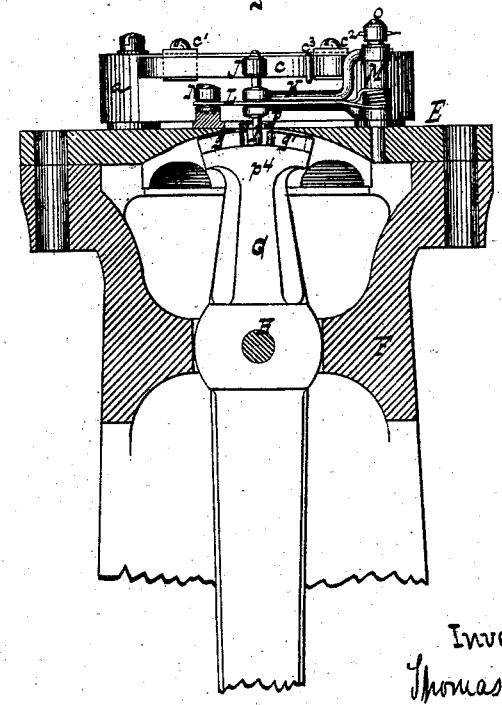
Figure 4:
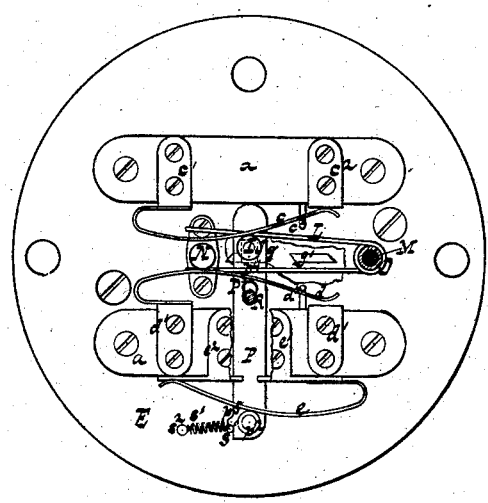
Figure 3:
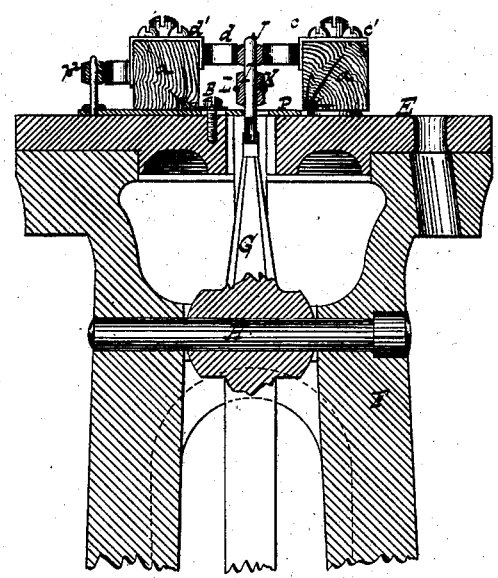

Figure 1 represents a top view of the switch-machine when the switch-rails are in line with a side track. Fig. 2 is a vertical section of the same in the plane $x\,x$, Fig. 1. Fig. 3 is a similar section in the plane $y\,y$, Fig. 1. Fig. 4 is a top view of the machine when the switch-rails are part way over in their passage from the side track to the main track, some portions being broken away, so as to expose the working parts. Fig. 5 is a similar view when the switch-rails are part way over in their passage from the main track to the side track. Fig. 6 is a side view of the pin which operates the circuit-closer, the cam-lever, and its connections with the switch-rails in the position when the switch-rails are in line with the main track. Figs. 7 and 8 are similar views of circuit-changing pin and the cam-lever in the positions which the same occupy when the switch-rails are in line with either of the side tracks. Fig. 9 is a sectional side view of the switch-machine and its connection with the switch-rails. Fig. 10 is a top view of the connection. Fig. 11 is a diagram illustrating the connections of my switch-machine with the battery and signals.

Similar letters indicate corresponding parts.

This invention consists in the combination, with the switch-rails of a railroad-track, and with a suitable signal to be operated by an electric current, the circuit of which is closed by a passing train, of three circuit-closers, which are controlled by the movement of the switch-rails, whereby the simple movement of the switch-rails from the main line to a side track will cause one circuit to be closed and opened again and another circuit to be opened and left open, and, in putting the switch-rail back on the main line, the circuit left open by the previous movement will be closed and remain so, and a third circuit will be closed and opened again during the movement of the switch-rail.

The position of the three circuit-closers is controlled by a cam-lever, which connects with the switch-rails by a sectional rod, so that, by lengthening or shortening said sectional rod, the correct position of the cam-lever in regard to mechanism for operating the circuit-closer can be insured at all times.

In the drawing, the letters $a\,a$ designate blocks of wood or other insulating material, to which the circuit closing points are attached. The letter $c$ designates a metallic spring, which is firmly secured to the metal plate $c^1$, and the free end of which stands opposite to a metal plate, $c^2$, being held away from the same by the elasticity of the spring itself. A stop, $c^3$, prevents the spring from receding too far. A similar spring, $d$, is fastened to a metal plate, $d^1$, its free end being opposite to and out of contact with a metal plate, $d^2$, being prevented from receding beyond the desired point by a pin, $d^3$. Another spring, $e$, is connected to the metal plate $e^1$, its free end being opposite to, but out of contact with, a metal plate, $e^2$, its position being controlled by the insulated button $p^2$.

Between the springs $c$ and $d$ is situated an insulated button, J, which is secured to a pin, I. This pin is secured in an arm, K, which swings on a stud, O, in a horizontal plane, so that the pin I is free to move in an arc described from the center of the stud O, the extent of its movement being controlled by a spiral spring, L, with long ends, said spring being so wound that its ends have a tendency to close up. The coiled portion of said spring is slipped on the reduced portion of a bushing, M, which fits the stud O loosely, and is situated between the forked ends of the arm K. The long ends of said spring lie in grooves on either side of the arm K, (see Fig. 2,) and they extend beyond said arm, and when in their normal position they lie in a groove formed on a stud, N, Fig. 2. By the action of the spring, therefore, when the same is in its normal position, the pin I will be retained centrally between the long ends of said spring and in line with the stud N. The pin I extends down through a slide, P, which is made of sheet-steel or any other suitable material, and which has a motion in the direction of its length, being held in position by a washer or roller, which works in a slot, $P^3$, and which has its bearing on a screw, R, under the head of which is placed a thin washer to cover the slot $P^3$, and to prevent dirt from lodging in said slot. On the slide P is secured the stud which carries the insulated button $p^2$. On the edge of said slide is formed a projection, $p^5$, which bears against a pin, s, Figs. 1, 4, and 5, fastened in the top plate E of the machine. A spring, $s^1$, which is secured at one end to a fixed stud, $s^2$, and at its opposite end to the slide P, serves to keep the edge of said slide in close contact with the pin s. In order to impart to the slide a motion in the direction of its length, sufficient power must be applied to force the projection $p^5$ past the pin s.

Near the end of the slide P opposite to that occupied by the roller-stud $p^2$ is an oblong slot, $p^4$, equal in length to the diameter of the pin I, and to the lateral motion which said pin has from its central position toward one side of the machine. Said pin extends down through the slot $p^4$, and it is acted on by cams $g$ $g'$ secured to the upper surface of a lever, G, which oscillates on an arbor, H, secured in the foot F of the machine, and which lever is connected to the switch-rails, as will be hereafter more fully described.

The cam-lever G is shown in its central position in Figs. 2 and 6, and if it is moved to either of the positions shown in Figs. 7 and 8 the beveled ends of the cams $g$ $g'$ engage with the pin I and force the same toward one side. While said cam-lever is being moved from the position shown in Fig. 6 to that shown in Fig. 8, the pin I is forced to one side by the cam $g$, (see Fig. 5,) and as said pin strikes the edge of the slot $p^4$ the slide P is caused to move, the projection $p^5$ being forced past the pin s, as shown in Fig. 5. In this position the slide is retained by the combined action of the spring $s^1$ and projection $p^5$. As the cam-lever G completes its movement the pin I slides past the outer end of cam $g$, and returns to its normal position (shown in Fig. 1,) while the cams $g$ $g'$ have the positions shown in Fig. 8, which position is the one assumed when the switch is off the main line, the slide P remaining, however, in the same position shown in Fig. 5, after the pin I has returned to its normal position, since the slot $p^4$ is so formed that the pin I can return to this position without moving the slide P. The motion just described takes place when the switch-rail T, Fig. 6, is brought in line with the side-track rail $T'$. During the time the pin I passes the cam $g$ the insulated roller J, mounted on said pin, presses against the spring $d$ and makes its free end close with the metal plate $d^2$, (see Fig. 5,) and at the same time the slide P is brought in such a position that the insulated button $p^2$ releases the free end of the spring $e$ from contact with the metal plate $e^2$, and consequently the continuity of a circuit of electricity of which spring $e$ and plate $e^2$ form parts will be broken.

If the switch-rail T is moved back in line with the main-track rail, as shown in Fig. 6, the top end of the cam-lever G moves in the direction of the arrow marked near it in Fig. 8, and during this motion the cam $g$ engages with the pin I and brings the same in the position shown in Fig. 4, where the spring $c$ is held against the plate $c^2$ by the button J, while the slide P is moved so as to throw the projection $p^5$ inside of the pin s, and the button $p^2$ will close the spring $e$ against the plate $e^2$. As the cam-lever completes its movement the pin I drops off over the acute angle of the cam $g$, thus opening the free end of spring $c$ from plate $c^2$; but the position of the slide P remains undisturbed, and the spring $e$ remains in contact with the plate $e^2$, while the pin I assumes its normal position (shown in Figs. 1, 2, and 6.) The continuity of a circuit through the spring $e$ and plate $e^2$ therefore remains unbroken until the next movement of the switch.

The cam-lever shown in the drawings is provided with the cams $g$ $g'$, so as to be adapted for a three-throw switch. The movement of the switch-rail T in line with the side-track rail $T^2$ and back, as illustrated by the position of the cam-lever G, (shown in Fig. 7,) would produce the same results as just described.

From the description it will be seen that by the aid of our improvement the simple movement of a switch-rail from the main line of a railroad to a side track will cause one circuit to be closed and opened again, and another circuit to be opened and left open, and that in putting the switch-rail back on the main line the circuit closer which was left open in the previous movement will be closed, and remain so, and a third circuit will be closed, and opened again during the movement of the switch-rail.

Our machine allows of many different ways of operating electric signals and circuits, and it may also be so arranged that two or more circuit closing or breaking points may be operated by the same mechanism above described, which operates one such point in the example shown in the drawings.

One manner in which our machine can be used in working electric signals is illustrated in the diagram shown by Fig. 11. In this diagram is shown a track-circuit closer, 1, which is operated by the wheels of a passing train, and which serves to close an electric circuit that tends to raise the signal 2 out of sight. Our switch-machine is connected to the moving rail of the switch 3, and the track-circuit closer 4 serves to let the signal down in sight. A battery, X, produces the requisite electric current. One pole of this battery connects directly with the ground Y, while its other pole connects with a wire, A, which runs to the opposite end of the section of signals to be operated by the battery X, and is there left free. Another wire, B, commences near the battery with its free end, and runs to the opposite end of the section of signals, where it connects with the ground Z.

By connecting the two line-wires A and B at any point, the battery-circuit will be completed, and a circuit can flow from battery X through wire A to point of connection, thence through wire B and ground Z Y back to the battery, thus causing the current to pass the entire length of the section at whatever point the wires A B will be connected. The switch-instrument E is shown with its circuit-closing springs in the position they will assume when the main line of the railroad is unbroken. The signal 2 is of such construction that when the same is raised out of sight it shows "safety," or, in other words, that the track is all right to approaching trains, and when the signal is down in sight it shows "danger" to approaching trains.

If the spring $1^a$ of the track-instrument 1 is closed, a circuit will flow from battery X, through ground Y Z, wires B B', spring $1^a$, wire 5, spring $e$ of switch-instrument E, wire $b$, to raising-magnet U of signal 2, and through wires A' A back to the battery. The signal 2 is moved to the position shown in dotted lines, Fig. 11, or out of sight. If the circuit-closing spring $2^a$ of track-circuit closer 4 is now closed, a circuit will be formed by battery X, ground Y Z, wire B $B^3$, spring $2^a$, wire 7, let-down magnet V, wires A' A, back to the battery. The signal is released, and drops in sight by its own gravity. If, however, the switch 3 is moved off from main line before the spring $1^a$ of track-circuit closer 1 is closed, the circuit-breaking spring $e$ of switch-machine E would be open, as shown in Figs. 1 and 5, and consequently the closing of spring $1^a$ would not complete a circuit, leaving the signal in its normal position, or at "danger." If, after the spring $1^a$ should be closed, and while the switch is on the main line, whereby the signal has been raised out of sight, the switch should then be thrown off from the main line, or the cam-lever G be moved from the position shown in Fig. 6 to the positions shown in Fig. 8, the motion of the switch would close the spring $d$ of switch-machine E, thus completing a circuit from battery X, ground Y and Z, wires B 8 7, let-down magnet V, wires A' A, back to the battery, and the signal will move in sight, or to "danger." At the same time spring $e$ of switch machine E would be opened, and, if the track circuit closing-spring $1^a$ is again closed, the signal will remain at "danger."

If the cam-lever G is moved to the position shown in Fig. 7, the same result is produced.

In applying our switch-machine to a switch the machine is bolted down to one end of a timber, $O^2$, Figs. 9 and 10, the opposite end of which supports the movable ends of the switch-rails. On this timber are fastened strips or sliding irons $P^a$, on which the rails move, said timber performing the duty and being put in place of the ordinary switch-sleeper. Now, on account of the switch-rails being movable and sliding on the timber, there can be no fastening between the rails and the timber that will insure a correct position of the rail when the same is moved from side to side, since said timber, from the effects of frost or other causes, may become shifted or moved from its original position, and by such shifting the proper relation of the cams $g$ $g'$ toward the pin T would be disturbed. In order to readjust the machine with convenience, the rod connecting the cam-lever G to the shoe $G^3$ of the switch-rails is made in two sections, $G^1$ $G^2$, which are connected by a screw-thread or otherwise, so arranged that said rod can be lengthened or shortened, and thereby the cams $g$ $g'$ can be restored to the proper position in relation to the pin I.

In the general application of our switch-machine to railroad-switches, the feet or bases of rail of different switches will be found to vary from each other in width in the place where it would be desirable to make the connection with the switch-machine; also, some switch-rails are increased in width by a piece of iron bolted to them, and forming a part of what are known as Tyler's, Wharton's, and other safety switch-guards.

In order to facilitate the operation of connecting the cam-lever of the switch-machine with the shoe $G^3$ of the switch-rails, said shoe is made of a plate of iron, the ends of which are turned up to form lips $G^a$ $G^b$, and which lie on the timber $O^a$ between the sliding irons $P^a$ $P^a$, (see Fig. 10,) said irons being a little thicker than the body of the shoe $G^3$, so that the rails bear on them, and not on the shoe.

The distance between the lips $G^a$ $G^b$ of the shoe is made somewhat greater than the widest rail or combination of rail and switch guard known. This excess of distance is occupied by a block, $G^4$, placed at one end of the shoe $G^3$, and fastened to said shoe by a screw-bolt, $Q^a$, which passes through a slot, $Q^b$, in said block, and screws into the shoe. The block $G^4$, therefore, can be moved between the lips $G^a$ $G^b$ of the shoe, and the shoe can be adjusted for rails of different width. Furthermore, the block $G^4$ has a recess, $R^a$, on its end, that comes nearest the shoulder $G^a$ of shoe $G^3$, for the purpose of interposing a strip or shine, $R^6$, if the shoe is to be used for narrow rails.

The shoulder $G^a$ is extended, and forms a forked end, $S^a$, which embraces the end $G^b$ of the section $G^2$ of the connecting-rod, and by passing a pin through the parts $S^a$ $G^b$ the connection between the shoe $G^3$ and the cam-lever G is completed, and by these means the shoe can be readily adapted to switch-rails of various width, and the cam-lever G can always be brought in the required position.

What we claim as new, and desire to secure by Letters Patent, is—

1. The combination, with the switch-rails of a railroad-track, and a signal adapted to be operated by an electric current, the circuit of which is closed by a passing train or otherwise, of three circuit-closers controlled by the movement of the switch-rails, substantially as described.

2. The combination of the sliding plate P and buttons $p^2$ J with circuit-closers $c\,d\,e$, and with the switch-rails of a railroad-track, substantially in the manner shown and described.

3. The combination of the projection $p^5$, pin $s$, and spring $s'$, with the sliding plate P, buttons $p^2$ J, circuit-closers $c\,d\,e$, and with the switch-rails of a railroad-track, substantially as specified.

4. The combination of the arm K and centralizing spring L with the sliding plate P, buttons $p^2$ J, circuit-closers $c\,d\,e$, and with the switch-rails of a railroad track, substantially as specified.

5. The combination of the cams $g\,g'$ with the sliding plate P, buttons $p^2$ J, circuit-closers $c\,d\,e$, and with the switch-rails of a railroad-track, substantially as described.

6. The combination of the cam-lever G, carrying the cams $g\,g'$, with the sliding plate P, buttons $p^2$ J, circuit-closers $c\,d\,e$, and with the switch-rails of a railroad-track, substantially as set forth.

7. The combination of the sectional connecting-rod $G^1\,G^2$, with the cam-lever G, sliding plate P, buttons $p^2$ J, circuit-closers $c\,d\,e$, and with the switch-rails of a railroad-track, substantially as described.

In testimony that we claim the foregoing we have hereunto set our hands and seals this 30th day of September, 1876.

THOMAS S. HALL. [L. S.]
GEORGE H. SNOW. [L. S.]

Witnesses:
WILLIAM R. GREENE,
S. C. HALL.